United States Patent [19]
Michelsen et al.

[11] Patent Number: 6,031,359
[45] Date of Patent: Feb. 29, 2000

[54] DIGITALLY CONTROLLED SWITCH MODE POWER SUPPLY FOR CHARGING RECHARGEABLE BATTERIES

[75] Inventors: Jesper Michelsen, Lyngby; Kim A. Andersen, Niva; Kim Rasmussen; Lars M Andersen, both of Ballerup, all of Denmark

[73] Assignee: Chartec Laboratories A/S, Denmark

[21] Appl. No.: 08/860,610

[22] PCT Filed: Oct. 10, 1996

[86] PCT No.: PCT/DK96/00432

§ 371 Date: Oct. 28, 1997

§ 102(e) Date: Oct. 28, 1997

[51] Int. Cl.[7] .......................... H01M 10/44; H01M 10/46
[52] U.S. Cl. ............................................. 320/141; 320/145
[58] Field of Search .................................... 320/106, 110, 320/124, 125, 132, 137, 139, 140, 141, 145, FOR 118, FOR 120, FOR 121, FOR 131, FOR 138; 323/282–285; 363/20, 21

[56] References Cited

U.S. PATENT DOCUMENTS

| | | |
|---|---|---|
| 4,021,717 | 5/1977 | Furuishi et al. . |
| 4,564,800 | 1/1986 | Jurjans ...................................... 320/145 |
| 4,954,767 | 9/1990 | Buisson et al. . |
| 4,961,043 | 10/1990 | Koenck . |
| 5,198,743 | 3/1993 | McClure et al. . |
| 5,341,069 | 8/1994 | Kosich et al. . |
| 5,359,280 | 10/1994 | Canter et al. . |
| 5,499,967 | 3/1996 | Teillaud et al. . |
| 5,513,088 | 4/1996 | Williamson ................................ 363/20 |
| 5,534,765 | 7/1996 | Kreisinger et al. ....................... 320/106 |
| 5,541,490 | 7/1996 | Sengupta et al. . |

FOREIGN PATENT DOCUMENTS

| | | |
|---|---|---|
| 0 618 678 A2 | 5/1994 | European Pat. Off. . |
| 0 623 987 A1 | 9/1994 | European Pat. Off. . |
| 05137273 | 6/1993 | Japan . |
| WO 96/25784 | 8/1996 | WIPO . |

Primary Examiner—Edward H. Tso
Attorney, Agent, or Firm—Michael A. Lechter; William R. Bachand; Squire, Sanders & Dempsey L.L.P.

[57] ABSTRACT

A method of charging rechargeable batteries with a switch mode power supply, the method comprising determining one or more battery charging parameters, and controlling the power output of the switch mode power supply by digitally generating a gate signal for controlling opening periods and closing periods of a switching means of the switch mode power supply, each of the durations of the opening periods and the closing periods of the switching means, respectively, being determined in response to the determined one or more battery charging parameters and one or more charging process reference values. In particular, a method is proposed of controlling the duty cycle of a switch in the switch mode power supply during charging of the battery based on determinations of one or more characteristic charging parameters of the charging process and comparisons of determined parameter values with desired parameter values.

29 Claims, 7 Drawing Sheets

DIGITALLY CONTROLLED SWITCH MODE POWER SUPPLY FOR CHARGING RECHARGEABLE BATTERIES

FIELD OF THE INVENTION

The invention relates to a method of controlling the output power of a switch mode power supply utilized for charging a rechargeable battery.

In particular, the invention relates to a method of controlling the duty cycle of a switch in the switch mode power supply during charging of the battery based on determinations of one or more characteristic charging parameters of the charging process and comparisons of determined parameter values with desired parameter values.

BACKGROUND OF THE INVENTION

When charging a rechargeable battery, for example a NiCd battery, an electrical voltage greater than the open circuit output voltage of the battery is applied to the terminals of the battery so that a current flow through the battery is generated. The current causes a chemical process to take place in the battery by which energy is stored in the battery.

When a battery is fully charged, the chemical process stops and energy supplied to the battery thereafter will be converted into heat. Since rechargeable batteries are housed in sealed containers, heat generation leads to increased pressure in the battery causing chemical destruction of the battery whereby the energy storing capacity of the battery is reduced.

Thus, when charging a battery, it is important to fully charge the battery and to stop charging the battery before generation of heat in the battery severely reduces the energy storing capacity of the battery.

Typically, the voltage across the battery terminals increases linearly during charging. However, when the battery is close to being fully charged, the voltage increases more steeply to a maximum, indicating that the state of being fully charged has been reached. Continued charging leads to a voltage drop because of the temperature increase as the temperature coefficient of the voltage is negative. Correspondingly, the charging current, typically, falls to a minimum at full charge and then increases.

In WO 92/15142 a method is disclosed in which charging of a battery can be precisely terminated, i.e. after having fully charged the battery and before reducing the capacity of the battery. The method comprises determining a remaining charging time during charging based on determined charging parameter values and desired charging parameter values.

Charging parameters may include the voltage across the battery, the charging current supplied to the battery, and/or the temperature of the battery. Empirically, it has been shown that the shape of curves of these parameters as a function of time correlates with the distance to the point in time where it is desirable to terminate charging. Having determined the shapes of the curves, the time needed to fully charge the battery may be determined from comparison with respective reference curves.

In U.S. Pat. No. 5.541.490 a battery pack for a portable computer is disclosed, comprising a controller for controlling output current of a battery charger. The control signal generated by the controller is a fixed frequency pulse width modulated signal, the duty cycle of which being determined in response to the voltage and temperature of the battery being charged and the charging current being supplied to the battery. The control signal is low pass filtered at the charger for provision of a DC value of the signal that is proportional to the duty cycle of the signal. The DC value is entered into an input of a summing amplifier, the output of which provides a feedback control signal to the battery charger.

SUMMARY OF THE INVENTION

It is desirable to charge a battery in an optimum way ensuring that the battery is fully charged within a short time period without harming the battery. Thus, it is desirable to monitor various battery charging parameters during charging and to control the power supplied to the battery during charging according to monitored battery charging parameter values.

It is an object of the present invention to provide a simplified method of controlling output power of a battery charger and to provide a battery charger operating according to such a method.

According to the present invention the above-mentioned and other objects are fulfilled by a method of charging rechargeable batteries utilizing a switch mode power supply. The method comprises determining one or more battery charging parameters and controlling the power output of the switch mode power supply in accordance with the determined one or more battery charging parameters. The output of the switch mode power supply is controlled by digitally generating a gate signal that controls opening periods and closing periods of a switching means of the switch mode power supply. Durations of opening periods and closing periods of the switching means, respectively, are determined from the determined one or more battery charging parameters and one or more charging process reference values.

Further, a battery charger for charging a rechargeable battery is provided. The battery charger comprises a switch mode power supply, a battery parameter determining device for determining one or more battery charging parameters during charging of the rechargeable battery, and control unit for controlling the switch mode power supply in response to the battery charging parameter values received from the battery parameter determining device.

The control unit includes a storage circuit for storing charging process reference values, a duty cycle determination means for determining durations of the opening periods and the closing periods of the switching means, respectively, in response to at least one of the battery charging parameter values received from the battery parameter determining device and at least one of the charging process reference values, and a signal generator for digitally generating a gate signal for controlling opening periods and closing periods of a switching means of the switch mode power supply according to the determined durations, respectively.

The power output of the battery charger is adjusted in response to measured battery charging parameter values for attaining a desired charging process.

The method and apparatus may be utilized for charging rechargeable batteries of any type, such as nickel cadmium (NiCd) batteries, nickel metal hydride (NiMH) batteries, lithium (Li) batteries, etc.

The switch mode power supply may be an AC to DC converter or a DC to DC converter, such as a buck converter, a boost converter, a buck boost converter, a forward converter, a fly back converter, a push pull converter, a half bridge converter, a full bridge converter, or a Cuk converter.

The switch mode power supply may be a mains switching power supply or it may comprise a transformer for transforming the mains voltage to another voltage, preferably a lower voltage.

The switch frequency may be any frequency suitable for the battery charger in question, preferably, the switching frequency is in the range of 10 kHz–100 kHz, more preferred 15 kHz–50 kHz, most preferred 20 kHz–35 kHz.

Preferably, the switch frequency is above 20 kHz to prevent generation of an audible tone at the switch frequency.

The state of the battery being charged is monitored during charging, ensuring an optimum charging process, i.e. ensuring that the battery is fully charged within a short time period without harming the battery. Various battery charging parameters may be monitored during charging, such as the charging current supplied to the battery, the temperature of battery cells, the voltage of battery cells, the open circuit voltage of battery cells, the voltage at the battery terminals, the open circuit voltage at the battery terminals, etc.

Specific values of monitored battery charging parameters may be determined by direct measurement of the parameter in question or by calculation based on one or more measurements of one or more parameters.

The rate of change of the charging parameters as a function of time may be monitored. The rate of change may be determined by storing previously determined battery charging parameter values so that at a given time actual values may be compared with previously stored corresponding parameter values and rate of changes may be calculated.

Any function of battery charging parameters may be monitored during charging of the battery for utilization in determining a of the stop point in time of the charging process. For example, specific parameters may be averaged or integrated during a specific time period, etc.

The charging process may be stopped at a specific stop point in time that is determined from the monitored battery charging parameters and a set of desired parameter values. A stop point of the charging process may be reached when one or more specific parameters attain one or more respective desired parameter values.

When the voltage across the terminals of the battery being charged is monitored during charging, the charging current to the battery may be switched off for a short period during measurement of the voltage whereby generation of a voltage drop across the internal resistance of the battery by the charging current is avoided.

It may be advantageous to reduce the charging current gradually approaching the stop point in time of the charging process whereby determination of the optimum stop point of time may be more accurately determined. Thus, charging may be performed with a constant high charging current until one of the monitored parameters reaches a predetermined value and after that, the current may be reduced gradually.

The procedure of determining a stop point of time for the charging process may not be initiated until shortly before the battery is fully charged. Until then, a simple method may be used, which includes the step of monitoring of charging current or voltage for deciding when the more accurate procedure for determination of the stop point is to be initiated.

It may be an advantage to adopt some of the stop criteria which are used in the prior art as an additional safeguard. Thus, for example, a maximum charge period may be fixed. Charging will then be stopped at this point of time at the latest even though the other stop criteria have not yet been fulfilled. It is also possible to define threshold values for one or more of the measured parameters for charging to be terminated if one of the parameters exceeds or falls below corresponding threshold values.

After termination of charging, the amount of energy stored in the battery may be maintained by means of a pulsating current. This ensures that the battery remains fully charged if it stays in the charger after termination of charging.

A voltage may be applied to the battery before the actual charging is initiated for measurement of characteristic battery parameters whereby it may be determined whether a battery of correct type and without errors has been connected to the charger. If this is not the case, no charging takes place. Thus, attempts to charge wrong battery types or defective batteries where, for example, a cell is turned wrongly, are avoided.

The charging process is controlled by adjusting the power output of the switch mode power supply supplying charging current to the battery in response to monitored battery charging parameters.

The switching means of the switch mode power supply comprises one or more switches, such as bipolar transistors, FET transistors, thyristors, etc. The power output of the switch mode power supply is adjusted by adjustment of the durations of opening periods and closing periods of switches of the switching means.

For example in a buck converter operating in continuous mode, the ratio between output voltage and input voltage of the converter is proportional to the ratio between the closing period and the total period of the switch.

Thus, the charging process can be controlled by adjusting the duration of the closing period in relation to the duration of the opening period of the switching means, whereby the power transferred to the battery is adjusted.

Typically, a prior art switch mode power supply includes an analog circuit for controlling the switching means. The circuit includes a ramp generator for generating a linearly increasing voltage and a voltage comparator for comparing of the ramp voltage with a specific threshold value. When the ramp voltage reaches the threshold, the control voltage of the switching means changes state, the switching means goes from a closed (on-state) to an open state (off-state), and the ramp is reset to zero. A clock signal restarts the ramp generator and changes the state of the control signal for the switching means so that the switching means changes from the off-state to the on-state.

It is an advantage of the present invention that circuitry as described in the previous section is no longer needed as the switching means may be controlled digitally, e.g. with a signal generator comprising a counter. The digital value of the counter directly controls the state of the switching means of the switch mode power supply. Thus, the cost of battery chargers according to the present invention is reduced.

Battery chargers according to the present invention are useful for charging batteries with large charging currents. It may be desirable to charge a battery with a large charging current to charge the battery in a very short time. However, large charging currents lead to greater heat generation which makes it even more critical to stop charging at the right time after having fully charged the battery so that excessive heat is not generated in the battery.

Further, the larger the current rating of a power supply is, the larger the cost of the power supply. However, the lower cost of battery chargers according to the present invention counteracts the cost increase of a larger current rating.

The signal generator may further comprise a first and a second register, a first digital word being stored in the first register for determining the duration of the opening period of the switching means and a second digital word being stored in the second register for determining the duration of the closing period of the switching means, the counter alternatingly counting down to zero from the first word and from the second word, respectively.

Typically, the power output of a switch mode power supply is adjusted by adjusting the duty cycle of the switching means in such a way that the switching frequency is kept constant to simplify the construction of the switch mode power supply and to minimize power component stress. When the duration of the closing period is increased by an amount the opening period is decreased the same amount by leaving the switch frequency unchanged.

The duty cycle of a switch is defined as the ratio between the closing period of the switch and the total switching period of the switch (i.e. the sum of the closing period and the opening period of the switch).

However, keeping the switch frequency constant may lead to duty cycle increments that are too large so that a charging current supplied by the switch mode power supply may only be adjusted in very large increments which may be insufficient for attaining an optimum charging process.

The duty cycle of the switching means may be adjusted by (a) adjusting the duration of the closing period without adjusting the duration of the opening period, (b) adjusting the duration of the opening period without adjusting the duration of the closing period, or (c), adjusting the duration of the closing period and the duration of the opening period, allowing the switch frequency of the switching means also to be changed. Using one or more of these techniques, the duty cycle of the switching means may be adjusted in small increments adequate for attaining an optimum charging process.

In general, any desired resolution of duty cycle may be obtained by varying operational duty cycles of the switching means as a function of time whereby the desired duty cycle value may be obtained as an average of the selected operational duty cycles over the time period in question.

A smaller or greater number of empirically determined reference parameter courses may be stored in the battery charger, memory. A reference parameter course includes values of the reference parameter as a function of the period of time lapsed since starting of the charging process. When it is desired to rapidly charge the rechargeable battery without substantially deteriorating the same, the ideal or desired process of charging mainly depends on the state of charge of the battery prior to starting the charging process. Therefore, the stored reference parameter courses may represent ideal or desired processes of charging for different starting states of charge of the battery. If the state of charge of the battery to be recharged is known or may be determined, the reference course with the starting state of charge closest to the actual state of charge of the battery to be recharged may be selected. And the process of charging the battery may be controlled so that the course of at least one parameter approximates the selected reference course. By controlling the process of charging, the battery is not harmed in any way, e.g. by exposure to unduly high voltage, unduly high charging current, or to undue heating, thereby maintaining a long life time of the battery.

In principle, the state of charge of the battery to be recharged may be determined by a special measuring step. The corresponding reference parameter course, adapted to the same or a similar starting state of charge, may then be selected, for example by providing the relevant information to the battery charger by suitable keys. In the preferred embodiment, however, the relevant reference course is selected automatically by the battery charger.

It should be understood that the charging process may be controlled in any suitable manner by which the course of the charging parameter may be approximated to the selected reference parameter course. In the preferred embodiment, however, the process of charging is controlled by controlling the energy supplied to the terminals of the battery. Preferably, the charging current supplied to the battery is relatively low at the beginning of the charging process, while the charging current is preferably maintained at substantially a constant maximum value during a subsequent major part of the charging process so as to accelerate the same.

Towards the end of the charging process the internal resistance of the battery cell may increase. Consequently the charging voltage tends to increase when the charging current is being maintained at a maximum value. An unduly high voltage may cause a detrimental temperature increase within the battery cells. Therefore, the voltage supplied to the terminals of the battery is preferably limited to a predetermined maximum value. The charging process is terminated at the expiration of a predetermined period of time starting when the voltage has reached the maximum value. This means that the charging voltage is preferably kept at the maximum value during said predetermined period of time, and as the inner resistance of the battery cells is increasing the charging current will normally decrease gradually during this period of time. The predetermined period is preferably selected so that the battery is substantially fully charged when the period of time has expired. Preferably, the predetermined period of time is related to the selected reference parameter course. Each reference parameter course includes information not only about the maximum charging voltage to be supplied to the battery, but also about the period of time in which such maximum voltage should be maintained at the end of the charging period.

As mentioned above, the reference parameter courses to be compared with the actual parameter course may be curves or graphs, and the comparison process may be performed by a pattern recognition technique by means of pattern recognition circuitry. In the presently preferred embodiment, however, the charging parameter is measured at short time intervals during charging. The measured parameter values are compared with corresponding reference values of the reference parameter courses. And the relevant reference parameter course is selected on the basis of comparison of such measured values and reference values. The comparison process may be performed during the charging process so that the control circuit or control unit may shift from one reference parameter course to another when the continued comparison process reveals that the reference parameter course chosen first is not the one which is closest to the actual charging process.

When comparing the charging parameter values with the reference values, it may be advantageous to compare the rate of change of the parameter values as a function of the charging time lapsed with corresponding reference values. As an example, the rate of change of the charging voltage as a function of the charging time lapsed may be compared with the corresponding reference values. In order to determine the open circuit voltage of the battery at the battery terminals, the charging current may be cut off for a short period of time.

The parameter values may be measured and the rate of change of the parameter values may be determined at uniform first time intervals, each determination of the rate of change being based on parameter values measured at corresponding second time intervals. Each second time interval is a multiple of the first time interval. The parameter values may be measured rather frequently, which means that a particular first time interval may be relatively short, for example about 10 seconds. The rate of change is, however, preferably based on measurements with a time spacing being several times greater, for example 90 seconds.

The determination of the rate of change may be initiated at the beginning of the charging process. However, the determination of the rate of change may advantageously be postponed until a measured value of the characteristic parameters exceed a predetermined value.

Stored reference parameter courses may comprise not only courses representing charging processes which are ideal or desired for one and the same type of battery, but also a plurality of reference parameter courses for each of two or more different types of battery. In such case the first process step may be to determine the type of the battery to be charged and to select the reference parameter courses related to that type of battery. Thereafter, the process may proceed as described above.

BRIEF DESCRIPTION OF THE DRAWINGS

The invention will now be further described with reference to the drawings, in which.

DETAILED DESCRIPTION OF THE INVENTION

Figure 1:
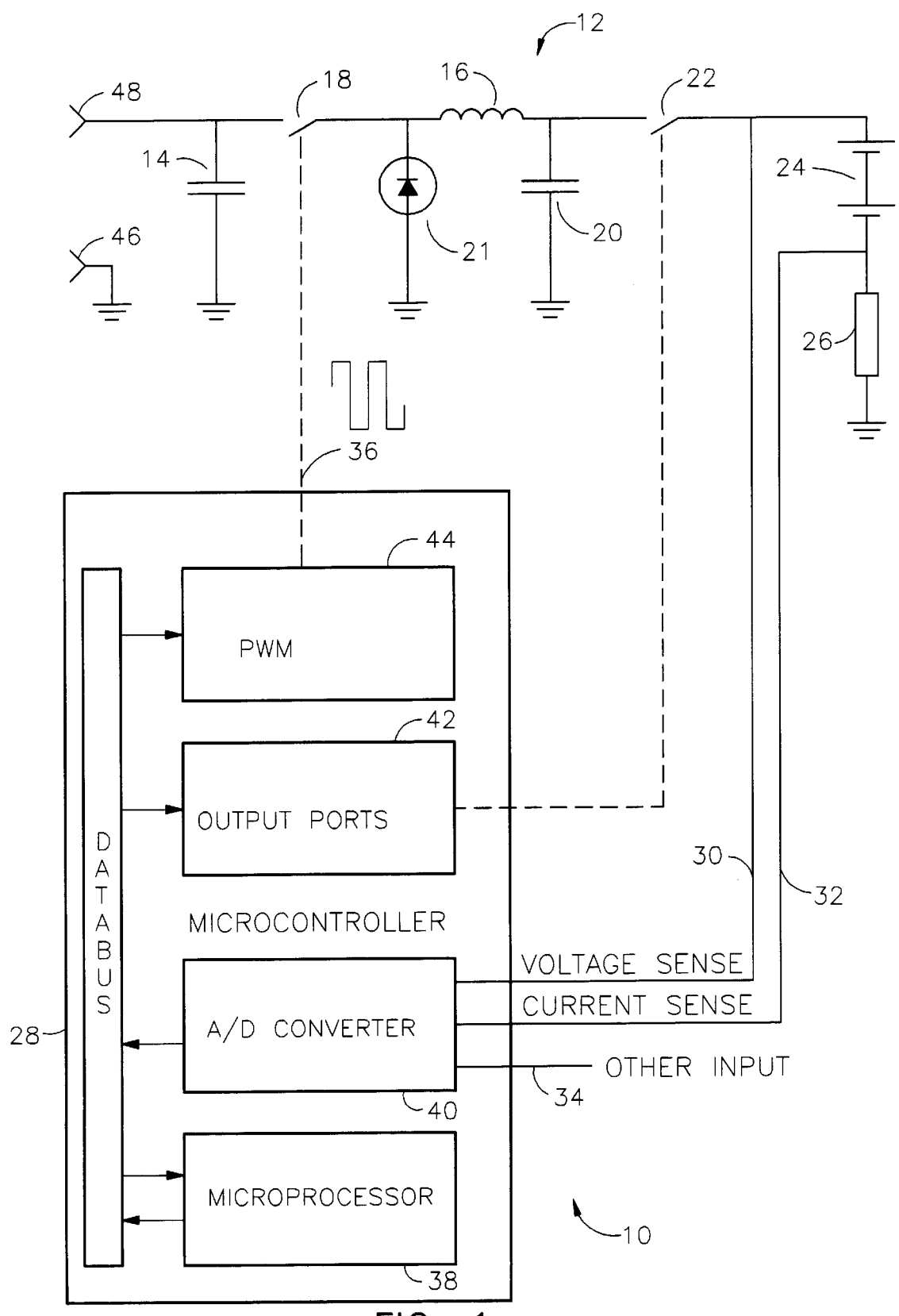
FIG. 1 is a block diagram illustrating the operating principles of an embodiment of the invention.

The basic operational principles of a battery charger according to the invention are illustrated in FIG. 1. As shown, the battery charger 10 comprises a buck converter 12 comprising an input capacitor 14 for energy storage, a choke 16 for energy storage, a power switch 18 for intermittently transferring energy from the input capacitor 14 to the choke 16, an output capacitor 20, a diode 21 for conducting current flowing through the choke 16 during opening periods of the power switch 18, a switch 22 for disconnecting the battery charger 10 from the battery 24 being charged during measurement of the open circuit voltage of the battery, a sense resistor 26 for sensing the charging current supplied to the battery 24, and a microcontroller 28 for receiving voltage signals 30, 32, 34 indicating the voltage at the battery 24 terminals, the charging current supplied by the charger 10 to the battery 24 and the temperature of the battery 24 and for generating a control signal 36 controlling opening periods and closing periods of the switch 18 in response to the voltage signals 30, 32, 34.

The switch 22 may not be included in the circuitry, as the open circuit voltage at the battery terminals may be measured by opening the power switch 18 and allowing the output capacitor 20 to discharge through the battery 24 before measurement of the open circuit voltage.

The microcontroller 28 comprises a microprocessor 38 for controlling the operation of the microcontroller including determining durations of opening and closing periods of the power switch 18 in response to the voltage signals 30, 32, 34, an analog to digital converter 40 for conversion of the voltage signals 30, 32, 34 into binary values, output ports for generation of auxiliary control signals, such as a control signal for the output switch 22 controlling whether the switch 22 is open or closed, and a signal generator 44 for generation of the control signal to the power switch 18. The operation of the signal generator is discussed in more detail below.

The operation of a buck converter 12 is well known in the art. Input power is supplied to the terminals 46, 48 of the battery charger 10. Typically input power is supplied from a simple linear power supply connected to mains voltage and comprising a transformer transforming the mains voltage to a low AC voltage, e.g. app. 24 V peak to peak, and a rectifier for rectifying the ac voltage into a rectified voltage to be filtered to a DC voltage, e.g. app. 12 V DC, by the input capacitor 14 of the buck converter 12. When the power switch 18 is closed, a voltage equal to the input voltage minus the output voltage across the output capacitor 20 is applied across the choke 16 and thus, the current through the choke increases linearly while energy is stored in the magnetic field of the choke 16. When the power switch 18 is opened, the diode 21 is switched on and a voltage equal to the output voltage is applied across the choke 16 with opposite polarity and thus, the current through the choke 16 decreases linearly while energy is delivered from the magnetic field of the choke 16. It is well known that the ratio between the output voltage, i.e. the voltage across the output capacitor 20, and the input voltage, i.e. the voltage across the input capacitor 14, is equal to the duty cycle of the switch 18, i.e. the ratio between the duration of the opening period of the power switch 18 and the duration of the opening period plus the closing period of the switch 18. The charging current may be adjusted by adjusting the duty cycle of the power switch 18, as the charging current supplied to the battery 24 is equal to the ratio between the output voltage of the converter 12 and the internal resistance of the battery 24 (not shown) plus the resistance of the sense resistor 26.

Figure 2:
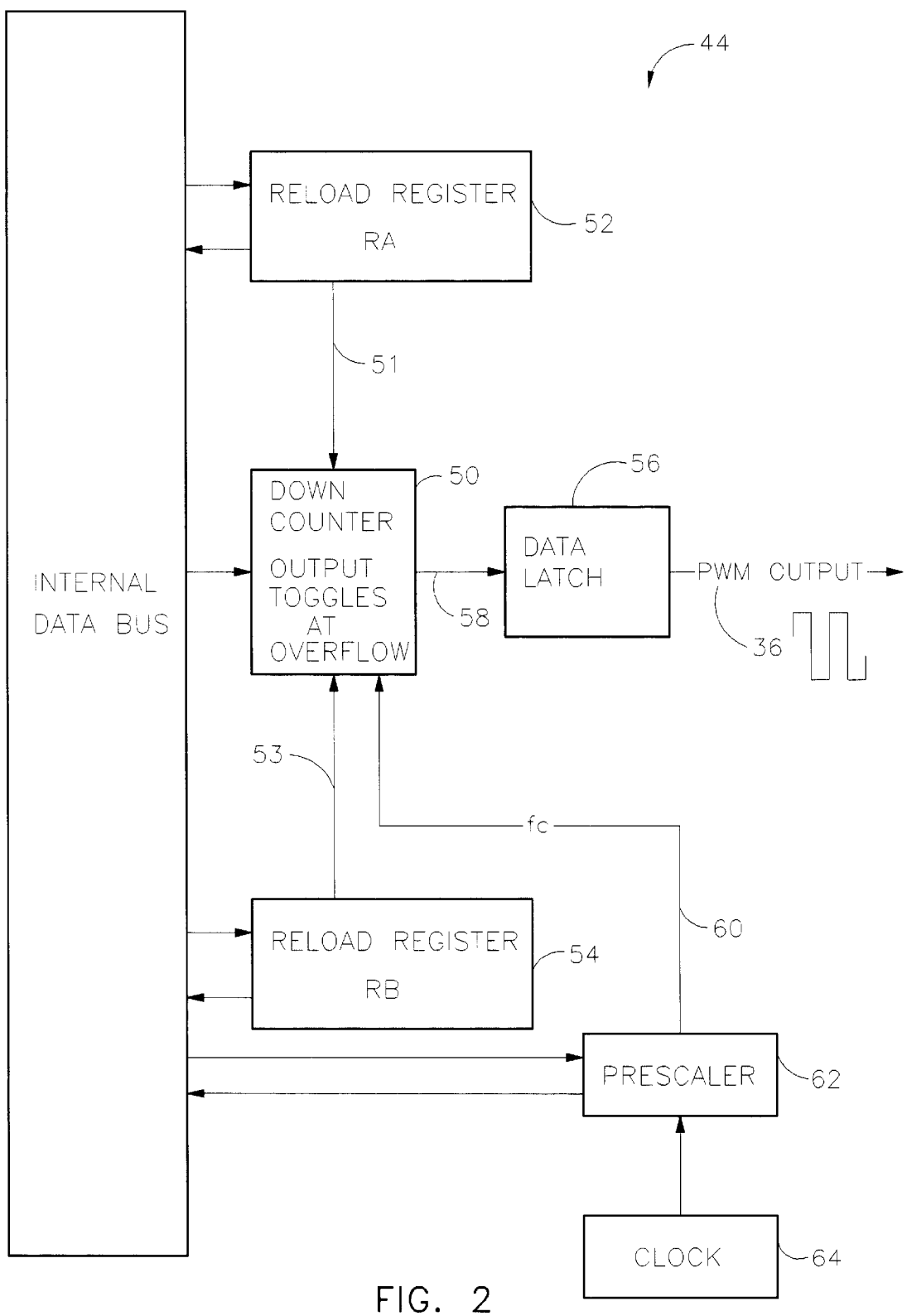
FIG. 2 is a block diagram of a signal generator operating according to the invention.

A block diagram of an exemplary embodiment of a signal generator 44 operating according to the invention is shown in FIG. 2. The signal generator 44 shown comprises a down counter 50 for counting down to zero from a binary value defined by inputs 51, 53 to the counter, a first register 52 and a second register 54, a first digital word being stored in the first register 52 for determining the duration of the opening period of the power switch 18 and a second digital word being stored in the second register 54 for determining the duration of the closing period of the switch 18. Having counted down to zero from the first word, the counter 50 outputs a pulse to the latch 56 on line 58 and the latch 56 toggles its output 36 from high to low whereby the power switch 18 is turned off. Simultaneously, the second word is loaded into the counter 50 from second register 54 and down counting from the second word is started. Likewise, having counted down to zero from the second word, the counter 50 outputs a pulse to the latch 56 on line 58 and the latch 56 toggles its output 36 from low to high whereby the power switch 18 is turned on. Simultaneously, the first word is loaded into the counter 50 from first register 52 and down counting from the first word is started. The down counter 50 is clocked by a clock signal 60 supplied by a programmable prescaler 62 programmed by the microprocessor 38 and clocked by a clock generator 64. It is seen that the switch frequency of the power switch 18 is determined by the sum of the first and the second word.

Figure 3:
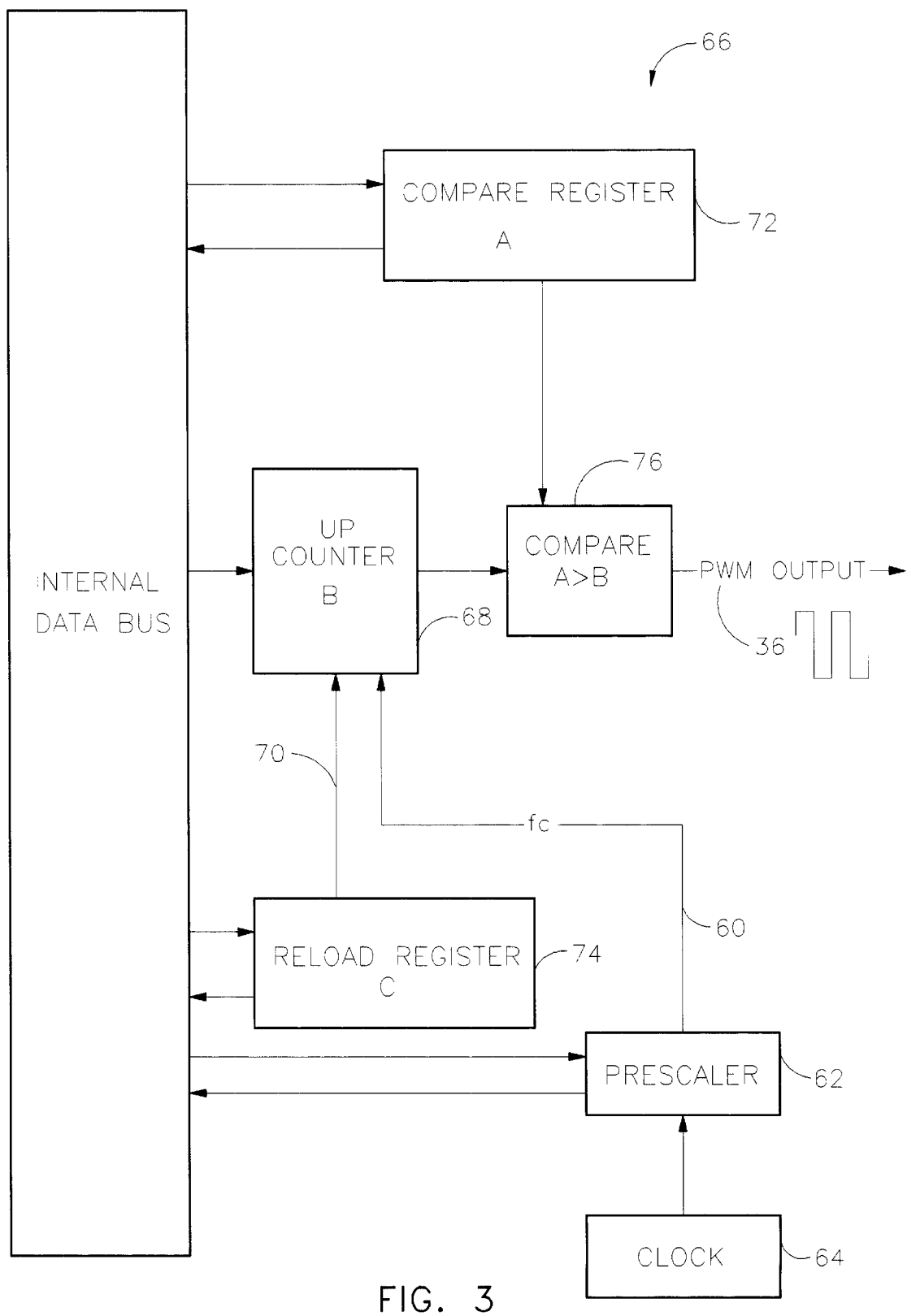
FIG. 3 is a block diagram of another signal generator operating according to the invention.

A block diagram of another exemplary embodiment of a signal generator 66 operating according to the invention is shown in FIG. 3. The signal generator 66 shown comprises an up counter 68 for counting up from a binary value defined by inputs 70 to the counter, a first register 72 and a second register 74, a first digital word being stored in the first register 72 for determining the duration of the opening period of the power switch 18 and a second digital word being stored in the second register 74. The duration of the closing period of the switch 18 is determined by the difference between the first word and the second word. A comparator 76 compares the content of the first register 72 with the content of the counter 68 and when the counter content is smaller than or equal to the content of the first register 72 the output 36 of the comparator is high and else it is low. Thus, during up counting, when the content of the counter 68 changes from all ones to all zeroes the output 36 of the comparator changes from low to high whereby the power switch 18 is turned on. Simultaneously, the second word is loaded into the counter 68 from second register 74 and up counting from the second word is started. When the content of the counter 68 overtakes the content of the first register 72, the output of the comparator 76 goes from high to low whereby the power switch 18 is turned off. The output 36 stays low until the counter content changes from all ones to all zeroes and the counting cycle is repeated. The up counter 68 is clocked by a clock signal 60 supplied by a programmable prescaler 62 programmed by the microprocessor 38 and clocked by a clock generator 64. It is seen that the switch frequency of the switch 18 is determined by the second word as up counting is started from the second word and continues until the counter content reaches all ones. It is preferred to keep the switch frequency constant and to change the duty cycle by changing the first word without changing the second word.

The signal generators 44, 66 shown in FIGS. 2 and 3, respectively, may be implemented utilizing commercially available microcontrollers including registers and counters as already described. For example, the circuit shown in FIG. 3 may be implemented with a ST62E60B or ST62E65B microcontroller manufactured by SGS Thompson. According to an embodiment of the invention, these microcontrollers are driven by a 6 MHz crystal oscillator leading to a 23.4375 kHz switch frequency at an 8 bit resolution of the duty cycle of the switching means. As explained further below, the resolution of the duty cycle and the switch frequency are inversely proportional to each other, e.g. the switch frequency is 46,8750 kHz at a 7 bit resolution of the duty cycle.

Further, the circuit shown in FIG. 2 may be implemented with a COP8ACC microcontroller manufactured by National Semiconductors. Typically, the clock generator 64 of a commercially available microcontroller operates at a rather low clock frequency, e.g. at 1 MHz, leading to a low resolution of the duty cycle of the control signal 36. For example, if the clock frequency is 1 MHz and the sum of the contents of the first register and the second register ($R_1 + R_2$) is equal to 32, the switch frequency is 1 MHz divided by 32 equal to 31.25 kHz and the resolution of the duty cycle is $\frac{1}{32}$. The resolution of the duty cycle can be increased by increasing the sum of the contents of the first register and the second register ($R_1 + R_2$), e.g. to 64. Then, however, the switch frequency is decreased, e.g. to 15.6 Khz which is in the audible range. Thus, the clock frequency of the clock generator 64 and the requirement of keeping the switch frequency above a certain frequency, e.g. above the audible frequency range, determines the resolution of the duty cycle when the switch frequency is kept constant.

As the output voltage of the battery charger is proportional to the duty cycle and the internal resistance of the battery is low, a low resolution of the duty cycle leads to large increments of the adjusted charging current, typically too large to attain an optimum charging process. However, if the switching frequency is allowed to change within a predetermined range, smaller increments of the duty cycle may be obtained as shown in the table below, in which $R_1$ content of the first register,
$R_2$ content of the second register,
f switching frequency in kHz,
RDuCy divided by 64 is the resulting duty cycle, and
DDuCy divided by 64 is the desired duty cycle.

| $R_1$ | $R_2$ | $R_1 + R_2$ | f | RDuCy | DDUCy |
|---|---|---|---|---|---|
| 16 | 16 | 32 | 31.25 | 32 | 32 |
| 17 | 16 | 33 | 30.3 | 32.97 | 33 |
| 17 | 15 | 32 | 31.25 | 34 | 34 |
| 18 | 15 | 33 | 30.3 | 34.91 | 35 |
| 18 | 14 | 32 | 31.25 | 36 | 36 |
| 19 | 14 | 33 | 30.3 | 36.84 | 37 |

In the example shown in the table above, the resolution of the duty cycle around a 50% duty cycle is $$\frac{1}{2R_1 + 2R_2} = \frac{1}{64}.$$

If the switch frequency is allowed to vary over a wider frequency range, the resolution of the duty cycle may be lowered.

In general, any desired resolution of duty cycle may be obtained by varying set duty cycles as defined by the first and second register contents as a function of time whereby the desired duty cycle value is obtained as an average of the set duty cycles.

For example, when duty cycles 10/64 and 11/64 can be set for the control signal 36, any duty cycle value in the range from 10/64 to 11/64 may be selected by selecting the duty cycle 10/64 for a first selected time period $P_1$ and 11/64 for a second selected time period $P_2$ resulting in an average duty cycle equal to $$\frac{\frac{10}{64}P_1 + \frac{11}{64}P_2}{P_1 + P_2}.$$

For example, increments of 1/256 may be obtained by dividing a specific time interval into four sub-intervals and selecting duty cycles in the sub-intervals as indicated below:
average[10/64, 10/64, 10/64, 10/64]=40/256
average[10/64, 10/64, 10/64, 11/64]=41/256
average[10/64, 10/64, 11/64, 11/64]=42/256
average[10/64, 11/64, 11/64, 11/64]=43/256

Figure 4:
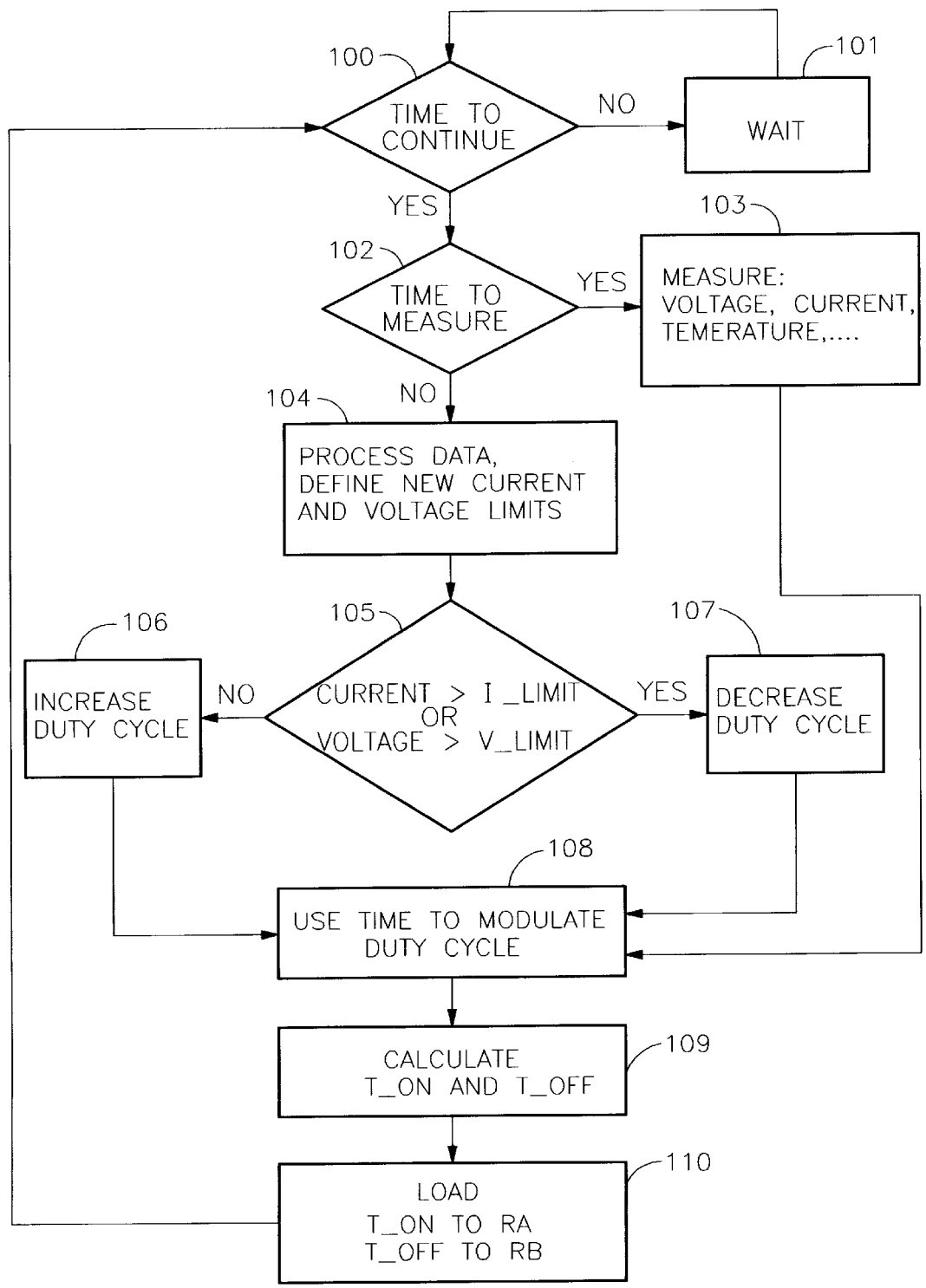
FIG. 4 is a flow diagram illustrating the operation of an exemplary embodiment of the invention.

The operation of an exemplary embodiment of the invention is illustrated in the flow diagram of FIG. 4. Boxes 100 and 101 constitute a waiting loop. Thirty two times a second, the waiting loop is exited and programme control is transferred to box 102 and further on to box 103 for measurement of battery charging parameters, such as charging voltage, charging current, battery temperature, etc. Every half second, programme control is transferred from box 102 to box 104 for averaging of the 16 previous measurements. Battery temperatures or temperature gradients are averaged over longer time periods typically, over ½ to 1 minute. The averaged values are compared to corresponding updated reference values in box 105 and the desired duty cycle is adjusted accordingly in boxes 106 or 107. As explained above and further explained with reference to FIG. 5, the desired duty cycle may be obtained by varying the actual duty cycle over time. This is done in box 108 in which the actual duty cycle is set either after comparison of the average values of battery charging parameters with reference values or after each measurement of the battery charging parameters. After calculation of the actual duty cycle in box 108, programme control is transferred to box 109 for calculation of the corresponding binary values $t_{on}$ and $t_{off}$, determining the opening and closing periods of the switching means, respectively, and in box 110 these values are loaded into the corresponding registers 52, 54 shown in FIG. 2.

Figure 5:
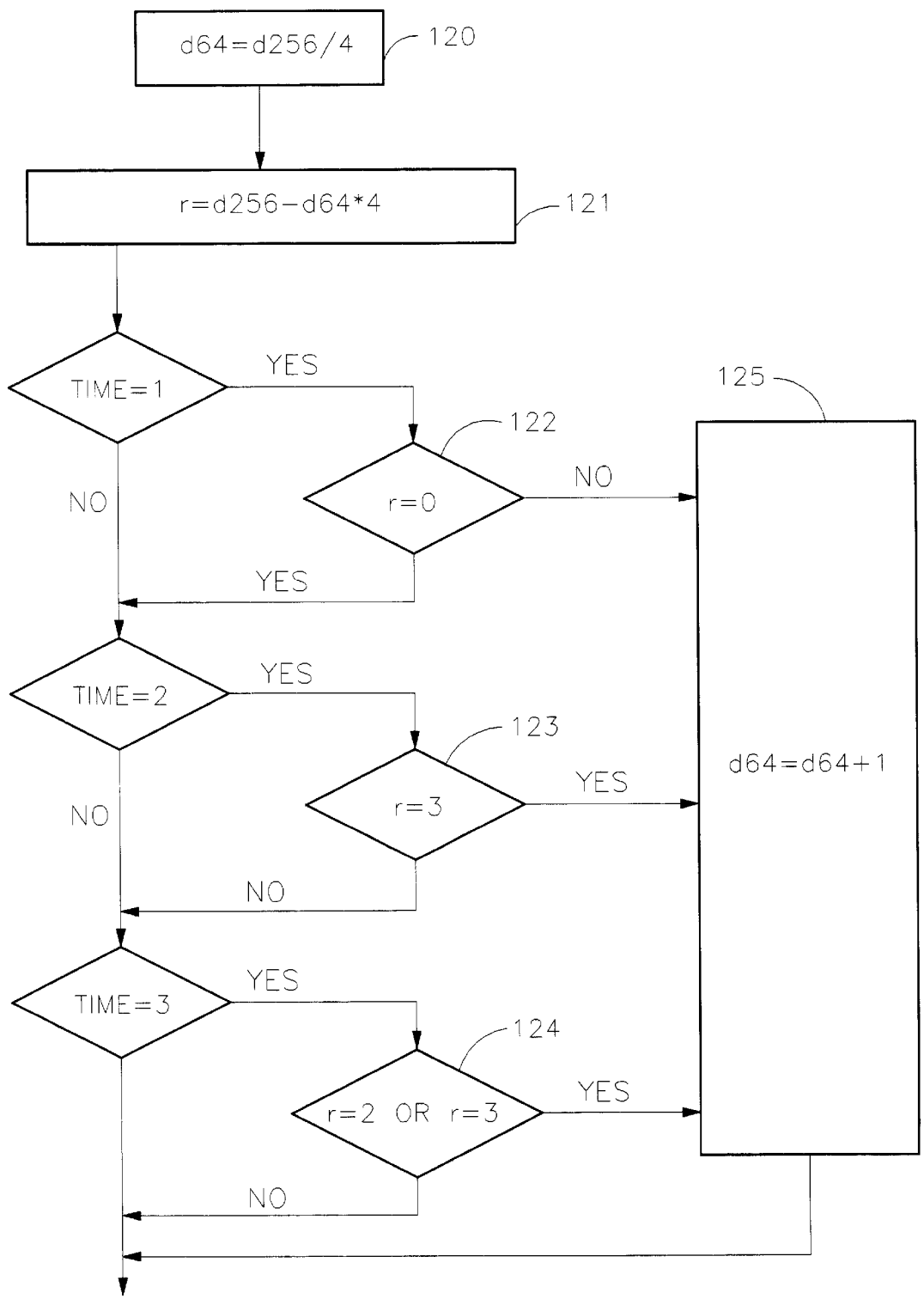
FIG. 5 is a flow diagram of modulation of the duty cycle.

The modulation of the duty cycle performed in box 108 in FIG. 4 is further illustrated in the flow diagram of FIG. 5. In the example given in FIG. 5, 5 bits are available in registers 52, 54 shown in FIG. 2 for determining opening periods and closing periods of the switching means. The 5 bit resolution is improved to a 6 bit resolution as described with reference to the table above and further described below with reference to FIG. 6.

In FIG. 5, the 6-bit resolution of duty cycle is improved to an 8-bit resolution by dividing time into four time intervals of identical length and by varying the actual duty cycle in each of the four time intervals as previously explained. For example, if the desired duty cycle is 42/256, this duty cycle may be obtained by setting the actual duty cycle to 10/64 during the first two time intervals and to 11/64 during the remaining two time intervals.

In box 120, the desired 8-bit duty cycle $d_{256}$.(42 in the example above) is divided by 4 to calculate the 6-bit duty cycle $d_{64}$ of the first time interval (time=0) and the remainder r of the division of the integers is calculated in box 121. If, for example, $d_{256}$ is 42, $d_{64}$ is 10 and r is 2. Duty cycle $d_{64}$ is incremented in box 125, if in the second time interval (time=1) r is not equal to 0 (box 122) or, if in the third time interval (time=2) r is equal to 3 (box 123) or, if in the fourth time interval (time=3) r is equal to 2 or 3 (box 124). If, for example, $d_{256}$ is 42, $d_{64}$ is 10 in the first and third time interval and 11 in the second and fourth time interval.

Figure 6:
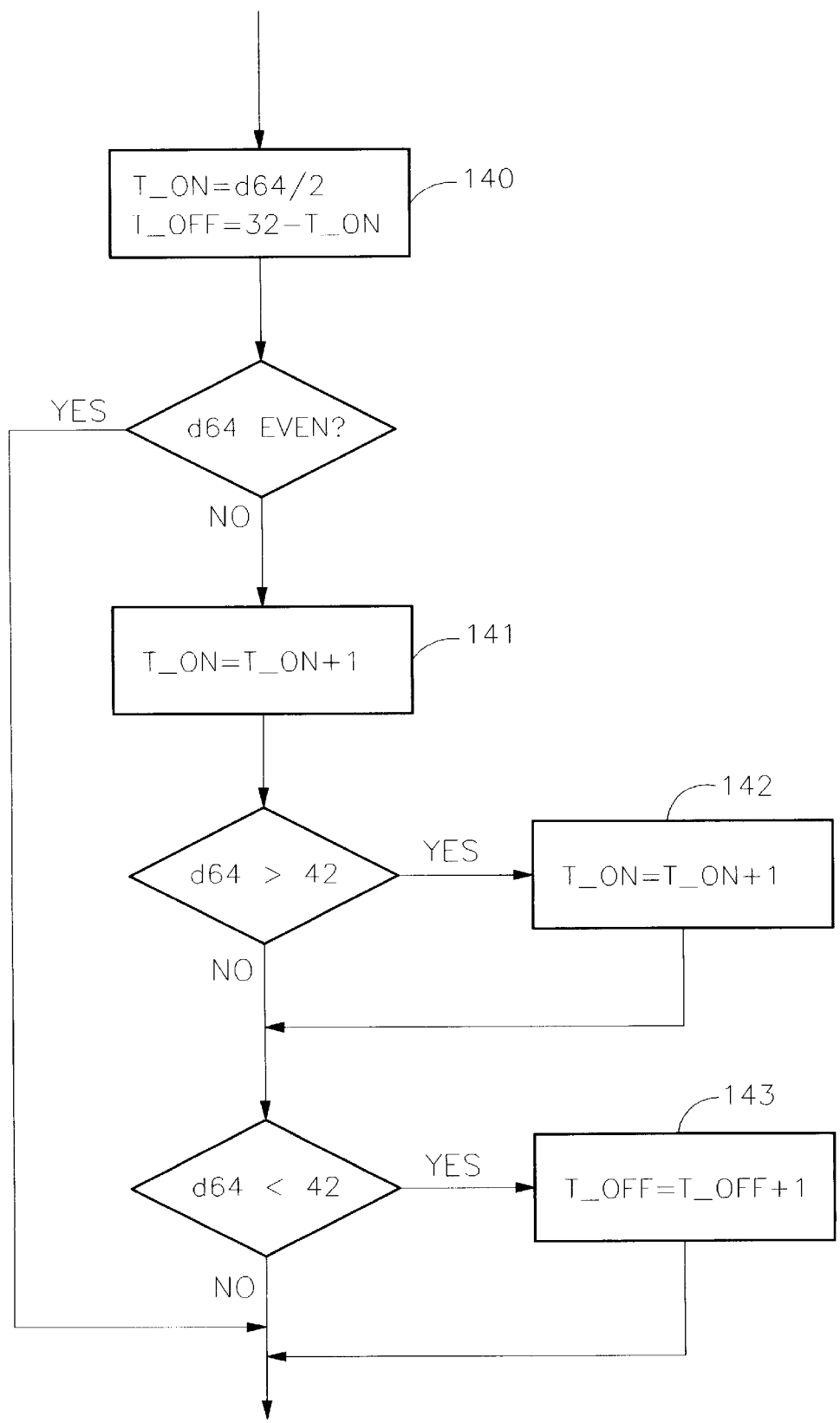
FIG. 6 is a flow diagram of calculation of closing time and opening time of the switch.

Calculation of the 5-bit binary values $t_{on}$ and $t_{off}$ performed in box 109 shown in FIG. 4 is further illustrated in the flow diagram of FIG. 6. In box 140 starting values of $t_{on}$ and $t_{off}$ are calculated and, if $d_{64}$ is even number no more calculations are carried out. If $d_{64}$ is odd, $t_{on}$ is incremented in box 141 and if $d_{64}$ is greater than 42, $t_{on}$ is incremented once more in box 142, while if $d_{64}$ is less than 22, $t_{off}$ is incremented by one. As already explained, this procedure allows the switch means frequency of the switching frequency to vary. However, as the charging current supplied by the battery charger is proportional to the duty cycle of the switching means, an improved resolution of the duty cycle leads to lesser ripple currents. For example, in the present example, a 5-bit resolution of the duty cycle typically corresponds to a 100 mA ripple current and a 6-bit resolution typically corresponds to a 50 mA ripple current.

Figure 7:
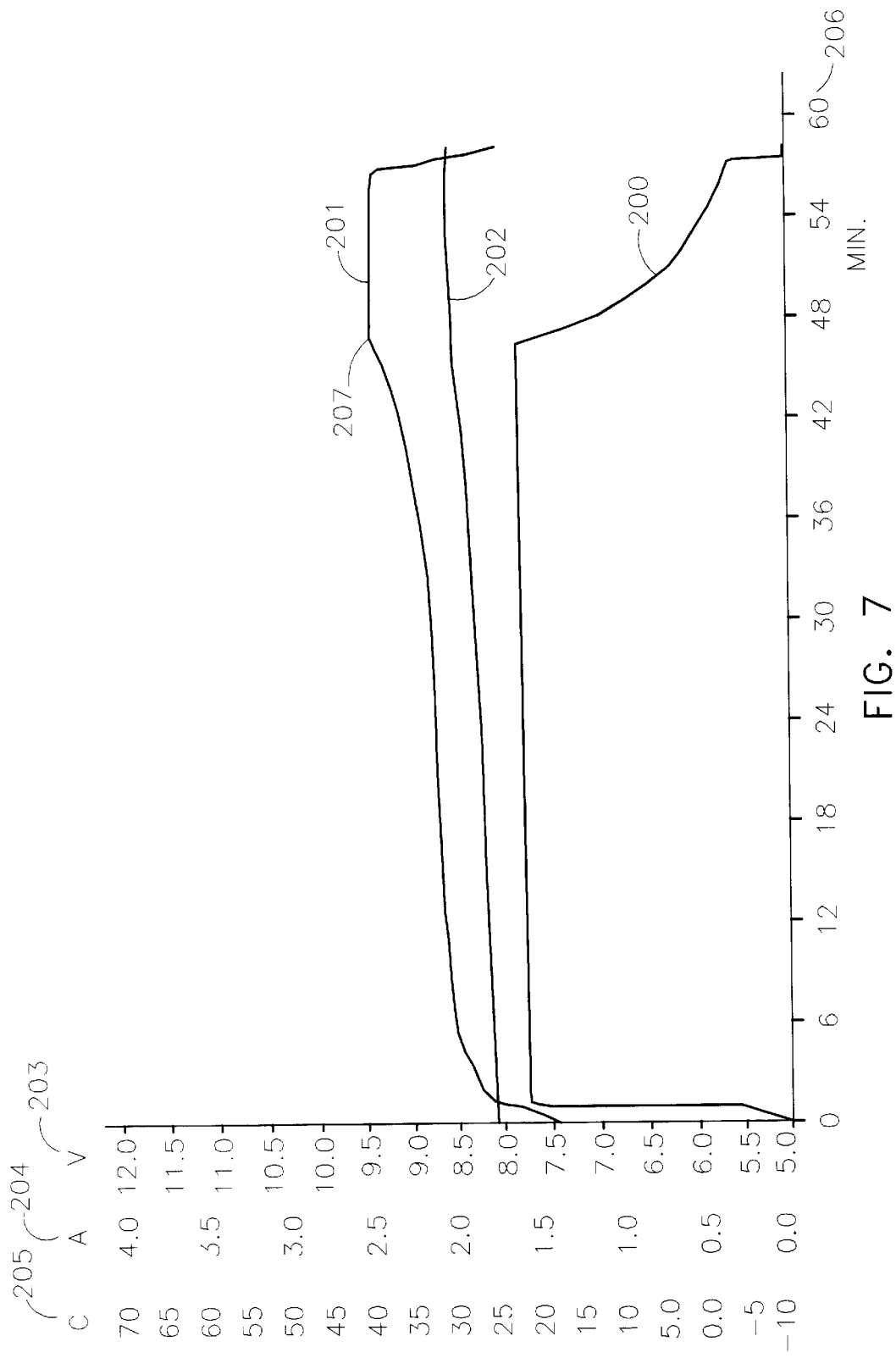
FIG. 7 is a plot illustrating the charging process of a NiCd battery.

FIG. 7 is a plot illustrating the charging process of a NiCd battery charged to a capacity of 1250 mAh. The plot shows the charging current 200, the open circuit voltage 201 of the battery, and the temperature 202 of the battery as a function of time. The units of the charging parameters are shown along the vertical axis of the plot in Volt 203, Ampere 204, and ° C. 205, respectively. Unit of time 206 is minutes. It is seen that the battery is fully charged in less than 60 minutes. It is also seen that the open circuit voltage of the battery increases during charging and that the charging current is lowered when the open circuit voltage has reached a predetermined value at 207. The internal resistance of the battery increases during the continued charging process and thus, the charging current is decreased as a function of time to keep the open circuit voltage at the predetermined value. Charging is stopped after a predetermined time period of a lowered charging current.

We claim:

1. A charging circuit for charging a battery, the circuit comprising:

a. a measurement circuit that determines a parametric battery value while the battery is coupled to the charging circuit; and b. a control circuit that provides a control signal, the control signal comprising a sequence of consecutive pulses, each pulse comprising a respective duty cycle selected from a set of predetermined duty cycles, the set having a duty cycle resolution, wherein the control circuit selects a plurality of duty cycles for the sequence from the set in response to the battery value; and c. a supply circuit that receives the control signal and provides a power signal for charging the battery, the power signal having a magnitude and a resolution, the magnitude being responsive to an average of the respective duty cycles, thereby power provided for battery charging is controlled with a power signal resolution of greater precision than the duty cycle resolution.

2. The charging circuit of claim 1 wherein the sequence has a pulse repetition rate within a predetermined frequency range, thereby reducing a ripple voltage of the power signal.

3. The charging circuit of claim 1 wherein the supply circuit comprises a converter from the set consisting of a buck converter, a boost converter, a buck boost converter, a forward converter, a fly back converter, a push pull converter, a half bridge converter, a full bridge converter, and a Cuk converter.

4. The charging circuit of claim 1 wherein:

a. the power signal comprises a charging current; and b. the measurement circuit provides the battery value in response to the charging current.

5. The charging circuit of claim 1 wherein:

a. the measurement circuit comprises a temperature sensor located for sensing a temperature of the battery; and b. the measurement circuit provides the battery value in response to the temperature.

6. The charging circuit of claim 1 wherein:

a. the battery provides a terminal voltage; and b. the measurement circuit provides the battery value in response to the terminal voltage.

7. The charging circuit of claim 1 wherein:

a. the power signal comprises a charging current;

b. the battery provides a terminal voltage; and c. the measurement circuit provides the battery value in response to the terminal voltage in the absence of the charging current.

8. The charging circuit of claim 1 wherein the control circuit comprises:
   a. a processor that operates according to a stored program;
   b. a counter that is preset to an initial count in response to the stored program and that provides a terminal signal when a terminal count is reached; and
   c. a bi-stable circuit that provides the control signal by toggling between a first state and a second state in response to the terminal signal.

9. The charging circuit of claim 8 wherein the initial count is non-zero.

10. The charging circuit of claim 1 wherein the control circuit comprises:
   a. a processor that operates according to a stored program;
   b. a counter that provides a count signal that is updated while counting;
   c. a register that is preset in response to the stored program and that provides a limit signal; and
   d. a comparator, coupled to the counter and to the register, for providing the control signal in response to comparing the count signal and the limit signal.

11. The charging circuit of claim 10 wherein:
   a. the control circuit further comprises a second register that is preset in response to the stored program, the second register providing an initial count signal; and
   b. the counter, having a counting range with an end count, limits the counting range in response to the initial count signal when the counter reaches the end count.

12. The charging circuit of claim 1, further comprising:
   a. a memory that retains a reference course;
   b. a timer that provides a signal for identifying a duration of battery charging; and
   c. a comparator that provides a difference value in response to comparing the battery value and a reference value, the reference value being recalled from the memory in response to the duration, wherein the control circuit selects the plurality of duty cycles from the set in further response to the difference value.

13. The charging circuit of claim 1 wherein:
   a. the supply circuit comprises a switching element that cooperates with a power storage element to provide the power signal, the switching element operative in response to the control signal; and
   b. the control circuit comprises:
      (1) a first register that stores a first binary value determining a duration of the opening period of the switching element;
      (2) a second register that stores a second binary value determining the duration of the closing period of the switching element;
      (3) a counter comprising a first input port, coupled to the first register, and a second input port, coupled to the second register, the first and second binary values, respectively, alternatingly being loaded into the counter when the counter reaches a third binary value; and
      (4) a latch that modulates the control signal when the counter reaches the third binary value.

14. The charging circuit of claim 1 wherein:
   a. the supply circuit comprises a switching element that cooperates with a power storage element to provide the power signal, the switching element operative in response to the control signal; and
   b. the control circuit comprises:
      (1) a first register that stores a first binary value determining a switch frequency of the switching element;
      (2) a second register that stores a second binary value determining a duty cycle of the switching element;
      (3) a counter comprising an input port coupled to the first register, the first binary value being loaded into the counter when the counter reaches a third binary value; and
      (4) a comparator that compares the counter binary value with the second binary value, the comparator comprising:
         (a) a first input port coupled to the second register;
         (b) a second input port coupled to the counter; and
         (c) an output, that modulates the control signal, when a sign of the difference between the counter binary value and the second binary value changes.

15. A method for charging a battery, the method comprising:
   providing a switch mode power supply comprising a switching element for developing an output signal for charging the battery, the switching element operative in response to a control signal;
   comparing a reference course and a measured parameter of the battery;
   determining a desired pulse width in response to the comparison; and
   providing the control signal to comprise a plurality of pulses, each pulse having a pulse width generated with fixed resolution, the plurality having a moving average pulse width responsive to the desired pulse width, thereby charging the battery in response to the reference course.

16. The method of claim 15 wherein the plurality is four.

17. The method of claim 15 wherein each pulse further has a duty cycle generated with the fixed resolution.

18. The method of claim 17 further comprising limiting variation of a pulse repetition rate of the control signal by limiting variation of each respective duty cycle.

19. The method of claim 18 wherein the pulse repetition rate is in the range from about 10 KHz to about 100 KHz.

20. The method of claim 19 wherein the pulse repetition rate is in the range from about 20 KHz to about 35 KHz.

21. A method for charging a battery, the method comprising:
   providing a switch mode power supply comprising a switching element for developing an output signal for charging the battery, the switching element operative in response to a control signal;
   comparing a reference course and a measured parameter of the battery;
   determining a desired duty cycle in response to the comparison; and
   providing the control signal to comprise a plurality of pulses, each pulse having a duty cycle generated with fixed resolution, the plurality having a moving average duty cycle responsive to the desired duty cycle, thereby charging the battery in response to the reference course.

22. The method of claim 21 wherein the plurality is four.

23. The method of claim 21 wherein the plurality has an integer quantity of pulses, and the step of generating further comprises:
   providing a target duty cycle by dividing the desired duty cycle by the integer;
   determining a remainder by subtracting, from the desired duty cycle, a product of the target duty cycle and the integer; and providing the respective duty cycle for each pulse in the plurality in response to identifying a selected duty cycle from the set consisting of the target duty cycle and the target duty cycle with an increment, wherein selecting is responsive to the remainder.

24. The method of claim 23 wherein each respective duty cycle comprises a respective pulse width and a respective pulse-to-pulse separation; and the step of providing the respective duty cycle further comprises:

determining the respective pulse width in response to dividing the target duty cycle by half the integer; and determining the respective separation in response to subtracting the respective pulse width from a constant.

25. The method of claim 24 further comprising determining the respective pulse width in further response to determining whether the target duty cycle is even.

26. The method of claim 25 wherein twice the constant defines a range comprising a multiplicity of subranges, and the method further comprises determining the respective pulse width in response to determining which subrange includes the target duty cycle.

27. The method of claim 25 wherein a multiple of the constant defines a range comprising a multiplicity of subranges, and the method further comprises determining the respective separation in response to determining which subrange includes the target duty cycle.

28. A method for controlling charging of a battery, the method comprising:

providing a memory having a plurality of stored reference courses;

measuring a parameter of the battery at each of a plurality of times during charging;

developing a parameter course from the plurality of measurements;

selecting a reference course from the plurality of reference courses by comparing the parameter course to at least one stored reference course;

governing further charging in response to the selected reference course; and repeating the steps of measuring, developing, selecting, and governing.

29. A method for controlling charging of a battery, the method comprising:

providing a memory having a plurality of stored reference courses, each course comprising a multiplicity of values, each value being a rate of change;

measuring a rate of change of a parameter of the battery at each of a plurality of times during charging;

developing a parameter course from the plurality of measurements;

selecting a reference course from the plurality of reference courses by comparing the parameter course to at least one stored reference course;

governing further charging in response to the selected reference course; and repeating the steps of measuring, developing, selecting, and governing.

* * * * *

Disclaimer 6,031,359—Jesper Michelsen, Lyngby; Kim A. Andersen, Niva; Kim Rasmussen; Lars M. Andersen, both of Ballerup, all of Denmark. DIGITALLY CONTROLLED SWITCH MODE POWER SUPPLY FOR CHARGING RECHARGEABLE BATTERIES. Patent dated February 29, 2000. Disclaimer filed November 2, 2000, by the assignee, Chartec Laboratories A/S.

Hereby enters this disclaimer to all claims of said patent.

(*Official Gazette*, January 16, 2001)